(12) United States Patent
Knajtner et al.

(10) Patent No.: US 11,003,575 B1
(45) Date of Patent: May 11, 2021

(54) SYSTEMS AND METHODS FOR CONTINUOUS INTEGRATION AUTOMATED TESTING IN A DISTRIBUTED COMPUTING ENVIRONMENT

(71) Applicant: JPMorgan Chase Bank, N.A., New York, NY (US)

(72) Inventors: Vladimir Knajtner, Brooklyn, NY (US); Michel Victor, Sunnyside, NY (US); Shahin Mahmoud Shahin, Clifton, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 15/297,212

(22) Filed: Oct. 19, 2016

(51) Int. Cl.
  *G06F 11/36* (2006.01)
  *G06F 16/23* (2019.01)
(52) U.S. Cl.
  CPC ...... *G06F 11/3688* (2013.01); *G06F 11/3692* (2013.01); *G06F 16/2358* (2019.01); *G06F 16/2379* (2019.01)
(58) Field of Classification Search
  CPC ............ G06F 11/3688; G06F 11/3692; G06F 17/30368; G06F 17/30377; G06F 16/2358; G06F 16/2379
  See application file for complete search history.

(56) References Cited

U.S. PATENT DOCUMENTS

| | | | |
|---|---|---|---|
| 7,146,608 B1* | 12/2006 | Newman | G06F 8/71 714/E11.207 |
| 8,386,419 B2* | 2/2013 | Yalamanchilli | G06F 17/30563 707/602 |
| 8,701,092 B1* | 4/2014 | Colcord | G06F 9/44 717/124 |
| 8,799,862 B2* | 8/2014 | Adamson | G06F 11/3664 717/102 |
| 9,934,385 B2* | 4/2018 | Chestna | G06F 21/577 |
| 2007/0083631 A1* | 4/2007 | Maccaux | G06F 11/3688 709/223 |
| 2009/0007074 A1* | 1/2009 | Campion | G06F 9/5072 717/124 |

(Continued)

OTHER PUBLICATIONS

Mike Roberts, "Enterprise Continuous Integration Using Binary Dependencies," 2004 [retrieved on 5/113/19], Extreme Programming and Agile Processes in Software Engineering, pp. 194-201, downloaded from <url>:https://link.springer.com. (Year: 2004).*

(Continued)

*Primary Examiner* — S. Sough
*Assistant Examiner* — Stephen D Berman
(74) *Attorney, Agent, or Firm* — Greenberg Traurig LLP (57) ABSTRACT

In one embodiment, a method for continuous integration automated testing in a distributed computing environment may include receiving data for a computer application into an automated testing schema; at least one computer processor executing a baseline test run and storing baseline test run results; receiving new code for the computer application at a test environment; the at least one computer processor executing a test run and storing test run results; the at least one computer processor comparing the test run results to the baseline test run results; and the at least one computer processor generating at least one report based on the comparing.

20 Claims, 8 Drawing Sheets

(56) References Cited

U.S. PATENT DOCUMENTS

| | | | | |
|---|---|---|---|---|
| 2010/0005341 A1* | 1/2010 | Agarwal | G06F 11/3688 | 714/38.11 |
| 2011/0289356 A1* | 11/2011 | Hossain | G06F 11/3672 | 714/38.1 |
| 2012/0221519 A1* | 8/2012 | Papadomanolakis | G06F 11/3688 | 707/615 |
| 2012/0290527 A1* | 11/2012 | Yalamanchilli | G06F 17/30563 | 707/602 |
| 2012/0331441 A1* | 12/2012 | Adamson | G06F 11/3664 | 717/102 |
| 2014/0282405 A1* | 9/2014 | Chan | G06F 11/3664 | 717/124 |
| 2015/0178182 A1* | 6/2015 | Mallya | G06F 11/3676 | 717/124 |
| 2015/0220426 A1* | 8/2015 | Spektor | G06F 11/36 | 717/131 |
| 2016/0034270 A1* | 2/2016 | Swierc | G06F 11/3668 | 717/126 |
| 2016/0162386 A1* | 6/2016 | Sivanesan | G06F 11/3672 | 717/124 |
| 2016/0275292 A1* | 9/2016 | Chestna | G06F 21/577 | |
| 2016/0358109 A1* | 12/2016 | Kruempelmann | G06Q 10/0633 | |
| 2017/0169370 A1* | 6/2017 | Cornilescu | G06F 8/71 | |
| 2018/0060066 A1* | 3/2018 | Rihani | G06F 8/71 | |

OTHER PUBLICATIONS

Sebastian Elbaum et al., "Techniques for improving regression testing in continuous integration development environments," 2014 [retrieved on Dec. 18, 2020],Proceedings of the 22nd ACM SIGSOFT International Symposium on Foundations of Software Engineering, pp. 235-245,downloaded from <url>:https://dl.acm.org (Year: 2014).*

* cited by examiner

| Tasks | Servers | Resources | Reports |

Task Status

| Task | Started | Elapsed Time | Status |
|---|---|---|---|
| tune_up_db | 20:17:00 | 27.8 min | Completed |
| report_branches_activit | 20:44:50 | 15.8 min | Completed Overtime |
| build | 21:01:50 | 1.2 hours | Completed Overtime |
| environment_housekee | 22:12:20 | 4.6 min | Completed Overtime |
| install | 22:16:30 | 3.1 min | Completed |
| rml_config | 22:20:50 | 2 sec | Completed |
| create_staging_dir | 22:20:50 | 1 sec | Completed |

Tune_up_db History

| Build | Date | Started | Completed | Elapsed Time |
|---|---|---|---|---|
| 788 | 20-Jul-2016 | 20:17:00 | 20:44:50 | 27.8 min |
| 787 | 20-Jul-2016 | 20:17:00 | | |
| 786 | 20-Jul-2016 | 20:02:10 | | |
| 754 | 06-Jul-2016 | 14:03:40 | 14:40:00 | 36 min |
| 694 | 24-May-2016 | 18:53:50 | 19:25:50 | 31.9 min |
| 688 | 20-May-2016 | 14:37:50 | 14:57:00 | 18.1 min |
| 679 | 17-May-2016 | 16:50:10 | 17:15:40 | 27 min |

Memory Use
Swap pages/sec
Load average
Network MB/s

Task Log

```
2016-07-20
20:17:52, 732 INFO                  tune_up_db | ======================>Tunning up
db ...

2016-07-20 20:17:52, 733 INFO tune_up_db | Running DB stats collection via dbxter 2016-07-20 20:17:52, 759 DEBUG         tune_up_db | + /apps/application1/scripts/dbxfer
-to_tns=SCHEMA1/AutoTester_13@DEVDB_SERVER
--run_db_stats 2016-07-20 20:17:52, 822 DEBUG         tune_up_db | dbxfer 12350 | Log is using /apps/application1/environments/dbxfer/log/

2016-07-20 20:17:52, 828 DEBUG         tune_up_db | dbxfer 12350 | dbxfer
server1.company.com 12350 160720 20:17:52 STATUS Process 12350 started on server1.company.com 2016-07-20 20:17:52, 828 DEBUG         tune_up_db | dbxfer 12350 | dbxfer
server1.company.com 12350 160720 20:17:52 INFO Arguments passed in:

2016-07-20 20:17:52, 828 DEBUG         tune_up_db | dbxfer 12350 | dbxfer
server1.company.com 12350 160720 20:17:52 INFO to_tns = SCHEMA1/AutoTester_13@DEVDB_SERVER 2016-07-20 20:17:52, 829 DEBUG         tune_up_db | dbxfer 12350 | dbxfer
server1.company.com 12350 160720 20:17:52 INFO Arguments passed in:

2016-07-20 20:17:52, 829 DEBUG         tune_up_db | dbxfer 12350 | dbxfer
server1.company.com 12350 160720 20:17:52 INFO run_db_stats =

2016-07-20 20:17:52, 829 DEBUG         tune_up_db | dbxfer 12350 | dbxfer
server1.company.com 12350 160720 20:17:52 INFO src_schema set to SCHEMA1

2016-07-20 20:17:52, 829 DEBUG         tune_up_db | dbxfer 12350 | dbxfer
server1.company.com 12350 160720 20:17:52 INFO to_schema set to SCHEMA1
```

Filter:            Showing the entire log

Figure 3

| Tasks | Feeds | Servers | Resources | Reports |
|---|---|---|---|---|

● FEED1
○ FEED2
○ FEED3
○ FEED4
　Slice 0
　Slice 1
　Slice 2
　Slice 3
　Slice 4
　Slice 5
△ ○ FEED5
△ ● FX1_FEED
△ ○ FEED6
△ ○ FX2_FEED
　○ FEED7
△ ○ FEED8
　○ FEED9
　○ FEED10
△ ○ FEED11
　○ FEED12
　○ FEED13
△ ● FEED14
　○ FEED15
△ ○ FEED16
　○ FEED17
△ ○ FEED18
　○ FEED19
△ ○ FEED20

Log content:
```
22.07.16-13:10:35 | DEBUG | server.company.com | Sq1Executor | | | | | SQL_DEBUG: [system_1] SELECXT * from TABLE1.COLUMN1 where COLUMN2 = 10659
22.07.16-13:10:35 | INFO | server.company.com | JdbcDataReader | | | | | loadContext Calc 10659 | +0:0.004 m:s.S.timer | DB Query Time
22.07.16-13:10:35 | DEBUG | server.company.com | Sq1Executor | | | | | SQL_DEBUG: [system_1] SELECT * from TABLE1.COLUMN1 where COLUMN2 = 10658
22.07.16-13:10:35 | INFO | server.company.com | JdbcDataReader | | | | | loadContext DifferenceVector 10658 | +0:0.004 m:s.S.timer | DB Query Time
22.07.16-13:10:35 | DEBUG | server.company.com | Sq1Executor | | | | | SQL_DEBUG: [system_1] SELECT * from TABLE1.COLUMN1 where COLUMN2 = 1616801582B6
22.07.16-13:10:35 | INFO | server.company.com | JdbcDataReader | | | | | loadContext Supply 161680158286 | + 0:0.004 m:s.S.timer | DB Query Time
22.07.16-13:10:35 | DEBUG | server.company.com | Sq1Executor | | | | | SQL_DEBUG: [system_1] SELECT * from TABLE1.COLUMN1 where COLUMN2 = 161690175596
22.07.16-13:10:35 | INFO | server.company.com | JdbcDataReader | | | | | loadContext ReferenceData 161690175596 | +0:0.001 m:s.S.timer | DB Query Time
22.07.16-13:10:35 | DEBUG | server.company.com | Sq1Executor | | | | | SQL_DEBUG: [system_1] SELECT * from TABLE1.COLUMN1 where COLUMN2 = 161690177060
22.07.16-13:10:35 | INFO | server.company.com | JdbcDataReader | | | | | loadContext MarketData 161690177060 | +0:0.003 m:s.S.timer | DB Query Time
22.07.16-13:10:35 | WARN | server.company.com | BatchRun | | | | |-calcContext CTX2:161680158286:MAIN_SYSTEM_REGION_SPOTM:20160616:20160617012434.000:20160617000847.000:10659
22.07.16-13:10:35 | DEBUG | server.company.com | MappingDataAccessLayer | | | | | sq1
= select *
FROM some_table
WHERE COL1 = 89
AND COL2 = 100
```

Filter: ____________    Showing the entire log

Figure 4

| Tasks | Feeds | Servers | Resources |

Servers

| Host | Server Type | Status | Port | Alloc | Used | Free |
|---|---|---|---|---|---|---|
| Server162 | FINANCIAL_CALC_SERVER | Running | 33937 | 200 GB | 1GB | 502 GB |
| Server162 | FINANCIAL_CALC_SERVER | Running | 33938 | 200 GB | 1GB | 502 GB |
| Server162 | MONITOR_SERVER | Running | 59000 | <1 GB | <1GB | 502 GB |
| Server163 | FINANCIAL_CALC_SERVER | Running | 33947 | 200 GB | 1GB | 502 GB |
| Server163 | MONITOR_SERVER | Running | 59000 | <1 GB | <1GB | 502 GB |
| Server163 | FINANCIAL_CALC_SERVER | Running | 43907 | 200 GB | 1GB | 502 GB |
| Server164 | FINANCIAL_CALC_SERVER | Running | 33927 | 200 GB | 1GB | 502 GB |

Server Log

IR+DIR:USA:C%KMD:!@](0)EX90_OLK_EDG_HOLDCO_10017969_FEED_NLN(1)COMPLLC
Regional/(2)COMPLLC Regional L/(!3)H+J62@KLD Region)/4)GLOBAL
EQUITIES/(5)Region_@)+2BN EQUITIES(6)EQ_REGION89/(7)Equity EX90_OLK and
Stock_&WE+90(@JK(8)IED_CO89+PLF-EX90_OLK(9)IED_LN_D_100000777(10)Country89_+234(!1)IE_LN_C_1313;NA FEED N'
on position TYERDRS+12@J.216642980491 - IR_ERROR: [RTR.3] Unknown IR
Spear &7NM for
:copy=USAcory=C%KMD;H8+VC#=92+GF=EX90_OLK_EDG_HOLDCO_10017969_FEED_NLN=COMPLLC
Regional/COMPLLC Regional.L/1/+J62@KLD Region=90+EQ_&H:GFRegion_@]+2BN
EQUITIES/EQ_REGION89/Equity EX90_OLK and
Stock_&WE+90@JK(9)IED_CO89+PLF-EX90_OLK(9)IED_LN_D_100000777Country89_+234/IE_LN_C_1313;region=NA;srcSystem=FEED_N;position=216642980491
19.08.16-08:27.57ERROR;server162(!)RTYERsDRS+12@J.Generator(8)||(E.c)
Unable to obtain Spear+_HY_P++78@HTTfrom TYERS+1_!4@J'
table by the key
IR+DIR:USA:C%KMD_[@](0)EX90_OLK_EDG_HOLDCO_10017969_FEED_NLN(1)COMPLLC
Regional/(2)COMPLLC Regional L/(!3)H+J62@KLD Region)/4)GLOBAL
EQUITIES/(5)Region_@)+2BN EQUITIES/(6)EQ_REGION89/(7)Equity EX90_OLK and
Stock_&WE+90(@JK(8)IED_CO89+PLF-EX90_OLK(9)IED_LN_D_100000777(10)Country89_+234(!1)IE_LN_C_1313;NA FEED N'
on position TYERDRS+12@J.216642980491 - IR_ERROR: [RTR.3] Unknown IR
Spear &7NM for
:copy=USAcory=C%KMD;H8+VC#=92+GF=EX90_OLK_EDG_HOLDCO_10017969_FEED_NLN=COMPLLC
Regional/COMPLLC Regional.L/1/+J62@KLD Region=90+EQ_&H:GFRegion_@]+2BN
EQUITIES/EQ_REGION89/Equity EX90_OLK and
Stock_&WE+90@JK(9)IED_CO89+PLF-EX90_OLK(9)IED_LN_D_100000777Country89_+234/IE_LN_C_1313;region=NA;srcSystem=FEED_N;position=216642980491
19.08.16-08:27.57ERROR;server162(!)RTYERsDRS+12@J.Generator(8)||(E.c)
Unable to obtain Spear+_HY_P++78@HTTfrom TYERS+1_!4@J'
table by the key
IR+DIR:USA:C%KMD_[@](0)EX90_OLK_EDG_HOLDCO_10017969_FEED_NLN(1)COMPLLC
Regional/(2)COMPLLC Regional L/(!3)H+J62@KLD Region)/4)GLOBAL
EQUITIES/(5)Region_@)+2BN EQUITIES/(6)EQ_REGION89/(7)Equity EX90_OLK and
Stock_&WE+90(@JK(8)IED_CO89+PLF-EX90_OLK(9)IED_LN_D_100000777(10)Country89_+234(!1)IE_LN_C_1313;NA FEED N'
on position TYERDRS+12@J.216642980491 - IR_ERROR: [RTR.3] Unknown IR
Spear &7NM for
:copy=USAcory=C%KMD;H8+VC#=92+GF=EX90_OLK_EDG_HOLDCO_10017969_FEED_NLN=COMPLLC Filter: [         ]     Showing the last 3 out of 6 MB GC Log
Standard Out
JStack

SYSTEMS AND METHODS FOR CONTINUOUS INTEGRATION AUTOMATED TESTING IN A DISTRIBUTED COMPUTING ENVIRONMENT

BACKGROUND OF THE INVENTION

1. Field of the Invention

The present disclosure generally relates to systems and methods for continuous integration automated testing ("AT") in a distributed computing environment.

2. Description of the Related Art

Existing open-source continuous integration ("CI") toolsets are designed to provide support for coarse-grained, job-level builds. Available CI plugins excel in supporting a test-driven development ("TDD") project with a well-developed unit test testbed. This is not the case with many existing applications that rely on end-to-end testing and are in general very difficult to integrate into such frameworks.

SUMMARY OF THE INVENTION

Systems and methods for continuous integration automated testing in a distributed computing environment are disclosed. In one embodiment a method may include (1) receiving data for a computer application into an automated testing schema; (2) at least one computer processor executing a baseline test run and storing baseline test run results; (3) receiving new code for the computer application at a test environment; (4) the at least one computer processor executing a test run and storing test run results; (5) the at least one computer processor comparing the test run results to the baseline test run results; and (6) the at least one computer processor generating at least one report based on the comparing.

In one embodiment, the data may be loaded from a production database for the computer application.

In one embodiment, the data may include a full copy of the production database for the computer application. In another embodiment, the data may include a portion of the production database for the computer application.

In one embodiment, the baseline run may be executed automatically in response to the production database for the computer application changing. In another embodiment, the baseline run may be executed automatically in response to a change in the computer application. The change may include one or more of a change in an output of the computer application, a change in compute resources for the computer application, and a change in performance of the computer application.

In one embodiment, the test environment may receive the new code from a master branch of a version control system. In another embodiment, the test environment may receive the new code from an alternate branch of a version control system.

In one embodiment, the test run may be an on-demand test run, a scheduled test run, etc.

In one embodiment, the method may further include the at least one computer processor identifying a regression in the test run results; and the at least one computer processor automatically identifying a commit that caused the regression.

In one embodiment, the at least one computer processor may disable the commit that caused the regression.

In one embodiment, the at least one computer processor may repeat the test run with the commit disabled.

In one embodiment, the at least one computer processor may iteratively disable commits and repeat the test run until a change that caused the regression is identified.

According to another embodiment, a continuous integration automated testing system is disclosed. The system may include a production database for a computer application; and a server comprising at least one computer processor and a memory, The at least one computer processor may perform the following: receive data for an application into an automated testing schema; execute a baseline test run and storing baseline test run results; receive new code at a test environment; execute a test run and storing test run results; compare the test run results to the baseline test run results; and generate at least one report based on the comparison.

In one embodiment, the at least one computer processor may identify a regression in the test run results; and automatically identify a commit that caused the regression.

In one embodiment, the at least one computer processor may disable the commit that caused the regression.

In one embodiment, the at least one computer processor may repeat the test run with the commit disabled.

In one embodiment, the at least one computer processor may further perform the following: iteratively disable commits and repeat the test run until a change that caused the regression is identified.

Embodiments may fortify testing of code maintained in a Source Code Management ("SCM") System by one or more of the following: (1) performing scheduled test runs automatically at least once a day—CI AT runs may cover both SCM repository's trunk and the current release branch at least once a day; (2) keeping run times short to be able to expand test coverage; (3) running on a set of input data that covers all application functions—these input data sets may be optimized for time and coverage; (4) including key application components and processes; (5) providing scalability to allow for coverage expansion; (6) running in a stable, reliable environment that may be isolated from other processes; (7) and providing a set of reports to track numeric accuracy, performance, stability, resource use and measure of code coverage.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-8.

Embodiments are directed to continuous integration automated testing in a distributed computing environment.

In one embodiment, the system may include a dedicated CI server plugin and a scripting framework for a rapid buildout of fine-grained, automated test cases and scenarios. It may seamlessly integrate into open-source CI server plugin architectures, allowing developers to write custom tasks and integrate them into the CI environment using well-crafted framework services.

Embodiments may support some or all of the following features:

Application/system configuration: all parameters are externalized and available via CI job metadata definition. Each run takes a pre-defined set of default parameters that are suitable for a scheduled run or can be edited before a manual run.

Task monitoring: Visual feedback is provided via progress bar for each running task, including the feedback on possible delays or failures.

History/live logs: Current task execution and its history is provided together with timing and logs.

Task dependencies: Task dependencies are defined as metadata. It is possible to specify whether a failure of a dependent task is tolerated or not.

Host resource monitoring: A User Interface ("UI") may provide a comprehensive display of resource use across a distributed test environment (CPU, memory, network, I/O). Resource reports may be used to compare resource use between different test runs.

Task control: Key features like task/run abort, resume from failed task, restart from the beginning are available directly from UI.

Remote process and resource control: Underlying CI framework provides a comprehensive and generic mechanism to remotely launch, monitor and terminate application processes.

Figure 1:
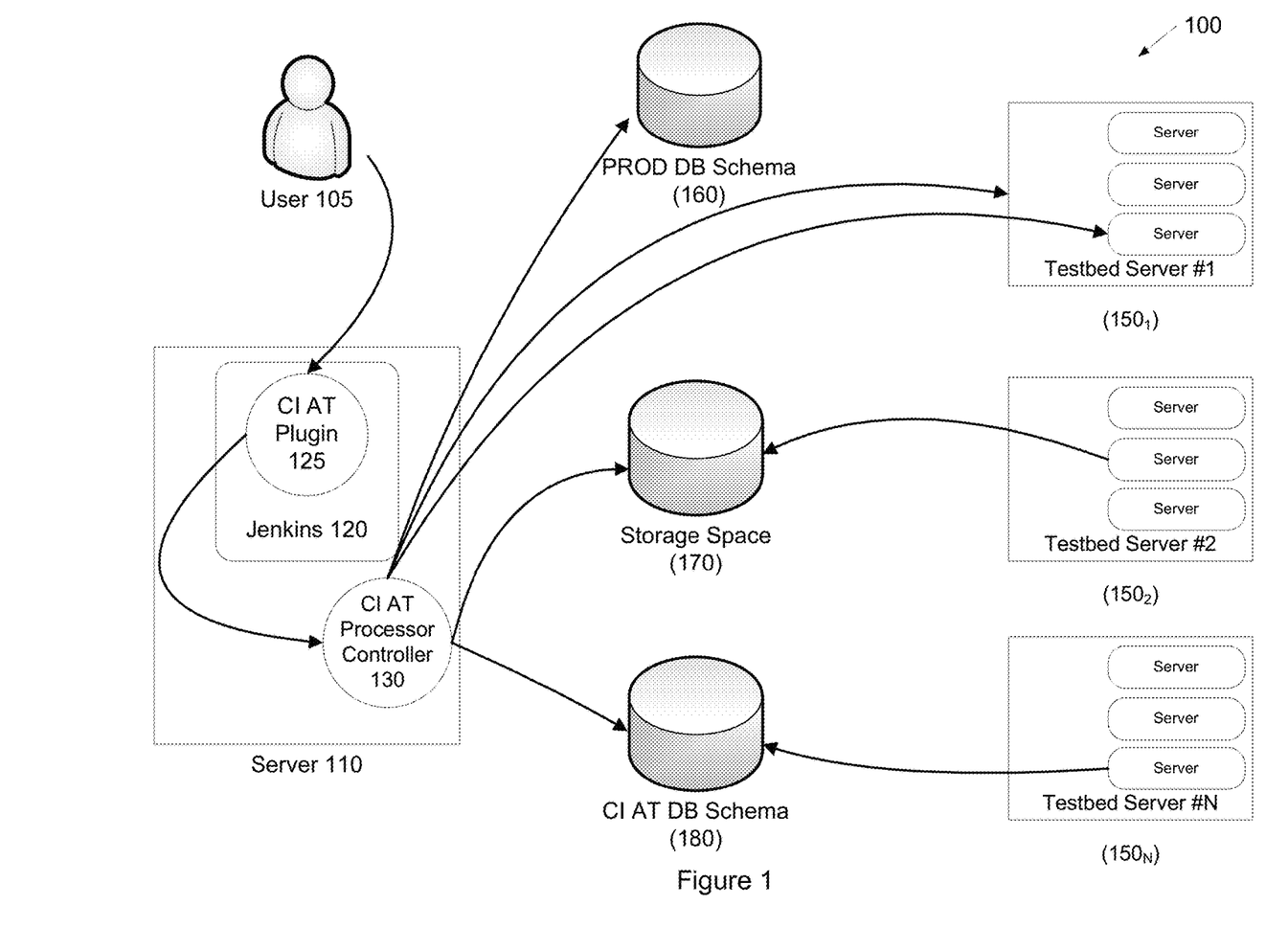
FIG. 1 depicts a system for continuous integration automated testing in a distributed computing environment according to one embodiment.
Figure 2:
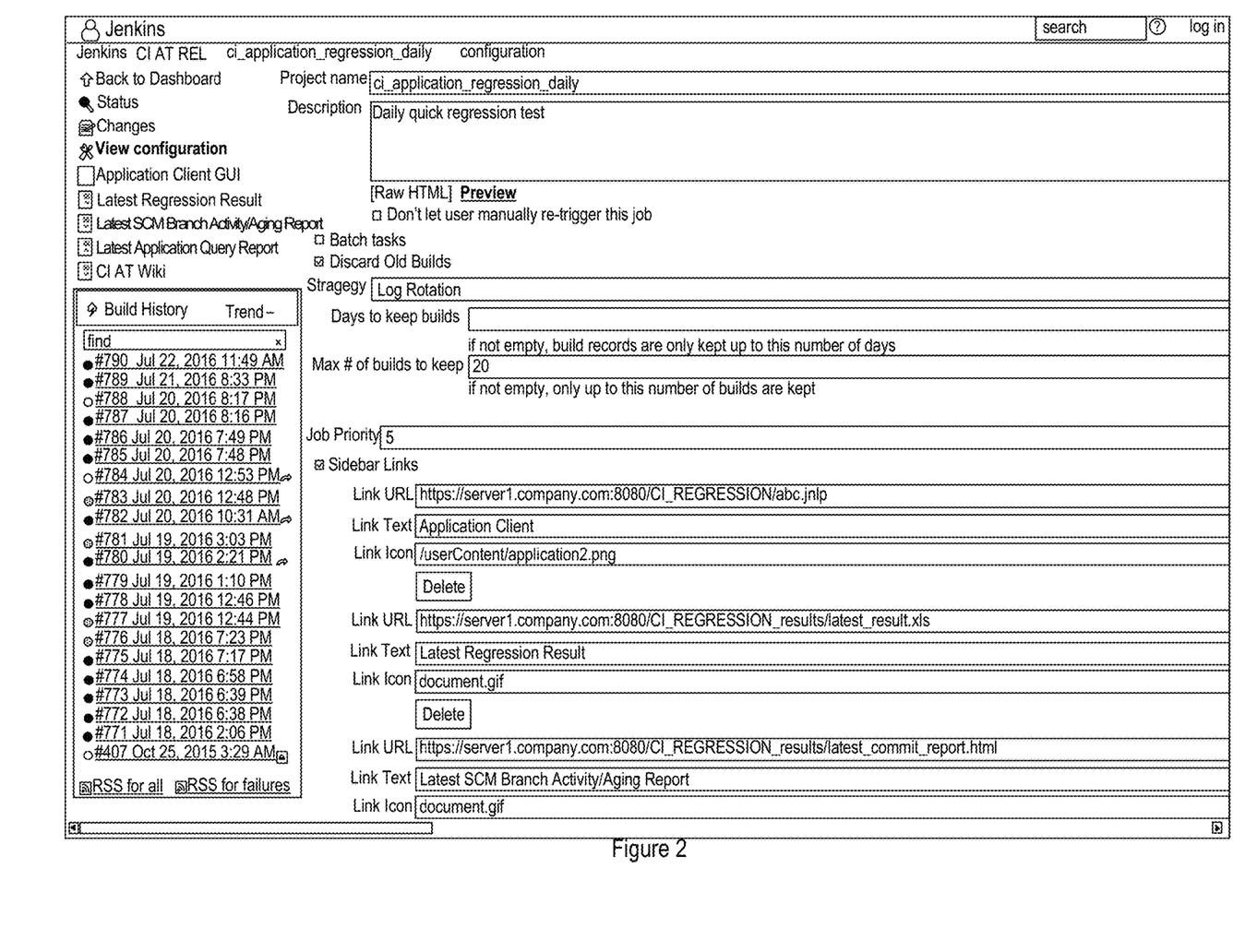
FIG. 2 depicts an exemplary user interface according to one embodiment.

Referring to FIG. 1, embodiments may be based on a framework that may comprise two or more components. Continuous Integration Automated Testing ("CI AT") Testbed system 100 may include server 110 that may host CI AT plugin component 125 and CI AT processor controller 130. CI AT plugin component 125 may be a Java component, and may use a continuous integration tool such as Jenkins 120. The plugin may interact with CI AT processor controller 130, which may isolate CI AT plugin component 125 from the actual test environment (e.g., testbed server #1 150$_1$, testbed server #2 150$_2$, testbed server #N 150$_N$). CI AT plugin component 125 may also serve static and dynamic web content, including, for example, AJAX notifications, report files, etc.

In one embodiment, CI AT plugin component 125 may be built using a build automation tool and may be deployed into a Web server instance using a deployment script.

CI AT processor controller 130 may be written in a scripting language, such as Python, and may be based on build automation tools such as Pybuilder. The framework may provide support for specific CI AT tasks, and may provide lower-level support for SCMs, System Activity Report ("SAR"), SSH, file system services, existing application shell scripts, database access, etc.

In one embodiment, PROD DB Schema 160 may be a copy of the database schema that is used by the application in a production environment. Storage Space 170 may be used to build and deploy the application and may also be used by the application, e.g., for cache storage, logs, and scratch space. CI AT Database 180 may be a database schema that is used by the CI system to persist state.

In one embodiment, CI AT Processor Controller 130 may launch and control test runs on one or more Testbed Servers (e.g., Testbed Server #1 150$_1$, Testbed Server #2 150$_2$, Testbed Server #N 150$_N$). CI AT Processor Controller 130 may also collect system statistics from, for example, PROD Database Schema 160 and/or one or more Testbed Servers (e.g., Testbed Server #1 150$_1$, Testbed Server #2 150$_2$, Testbed Server #N 150$_N$). It may further build, install, and log access to Storage Space 170, and may initialize test schema pools to determine test status with, for example, CI AT Database Schema 180.

In one embodiment, application servers hosted by one or more testbed servers (e.g., Testbed Server #1 150$_1$, Testbed Server #2 150$_2$, Testbed Server #N 150$_N$), may read data from PROD Database schema 160. Application servers hosted by one or more testbed servers (e.g., Testbed Server #1 150$_1$, Testbed Server #2 150$_2$, Testbed Server #N 150$_N$) may read/write runtime data from/to Storage Space 170. CI AT Plugin 125 and Processor Controller 130 may read/write runtime data from/to CI_AT Database 180. One or more application servers may be hosted by one or more testbed servers (e.g., Testbed Server #1 150$_1$, Testbed Server #2 150$_2$, Testbed Server #N 150$_N$) and may read or write application runtime data from/to CI AT Database.

In one embodiment, CI AT plugin component 125 may provide a user interface to configure and start application test runs. In one embodiment, run configuration parameters may be provided via the user interface and then written to run configuration files used by the application. The user may use these configuration files to start runs manually from the command line without using the user interface.

In one embodiment, run configuration may be entered via a user interface with a custom plugin within the CI tool. An example of such a user interface is provided as FIG. 2.

In one embodiment, the user interface may include a tasks tab that may detail the progress of executing tasks. An example is provided in FIG. 3. In one embodiment, the tasks tab may provide historic data for given tasks, as well as several views into the selected task (e.g., current or historical). For example, a task log may be provided.

Figure 3:
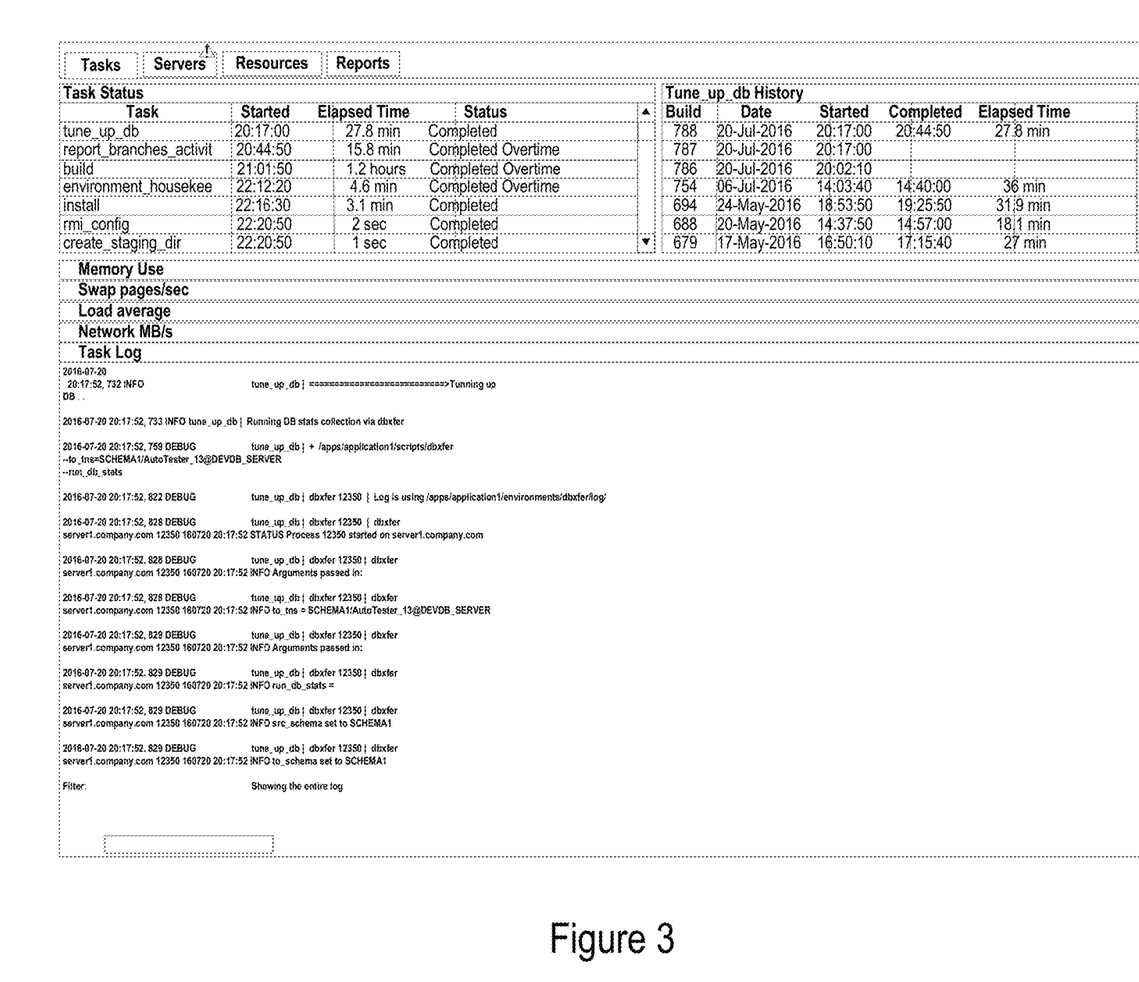
FIG. 3 depicts an exemplary tasks tab in a user interface according to one embodiment.

In one embodiment, log content may be searched, filtered, etc. as is necessary and/or desired.

In another embodiment, load averages on one or more configured application hosts during task execution may be provided. Swap activity, swap space use, and/or memory use during execution of a task may also be provided.

Figure 4:
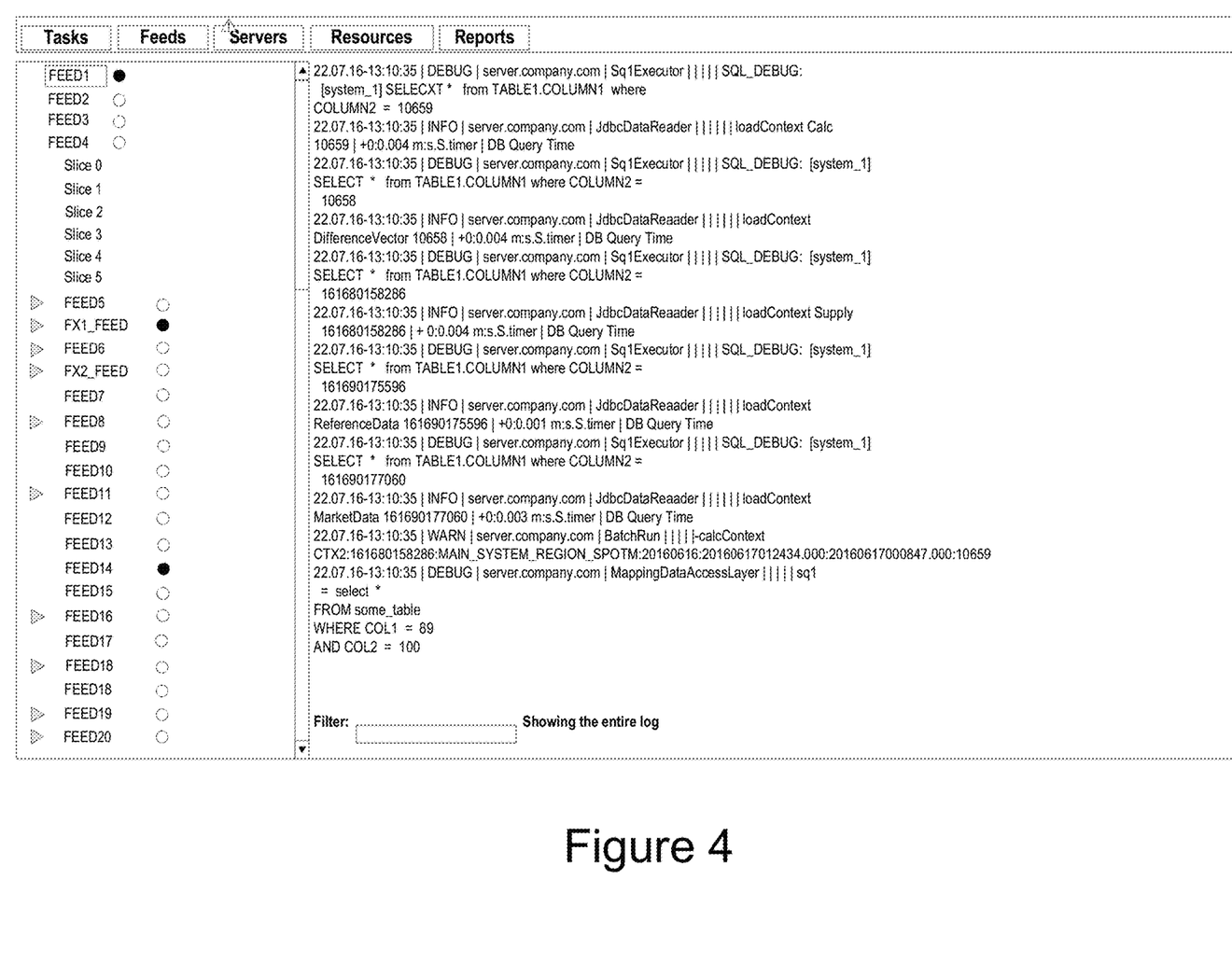
FIG. 4 depicts an exemplary feeds tab in a user interface according to one embodiment.

In one embodiment, the user interface may include tabs to monitor the application as it progresses through the run. An example is provided in FIG. 4. FIG. 4 shows a tab that displays a list of input data feeds that the application has consumed during the run. The list may be color-coded to visually show whether the feeds succeeded or failed.

Figure 5:
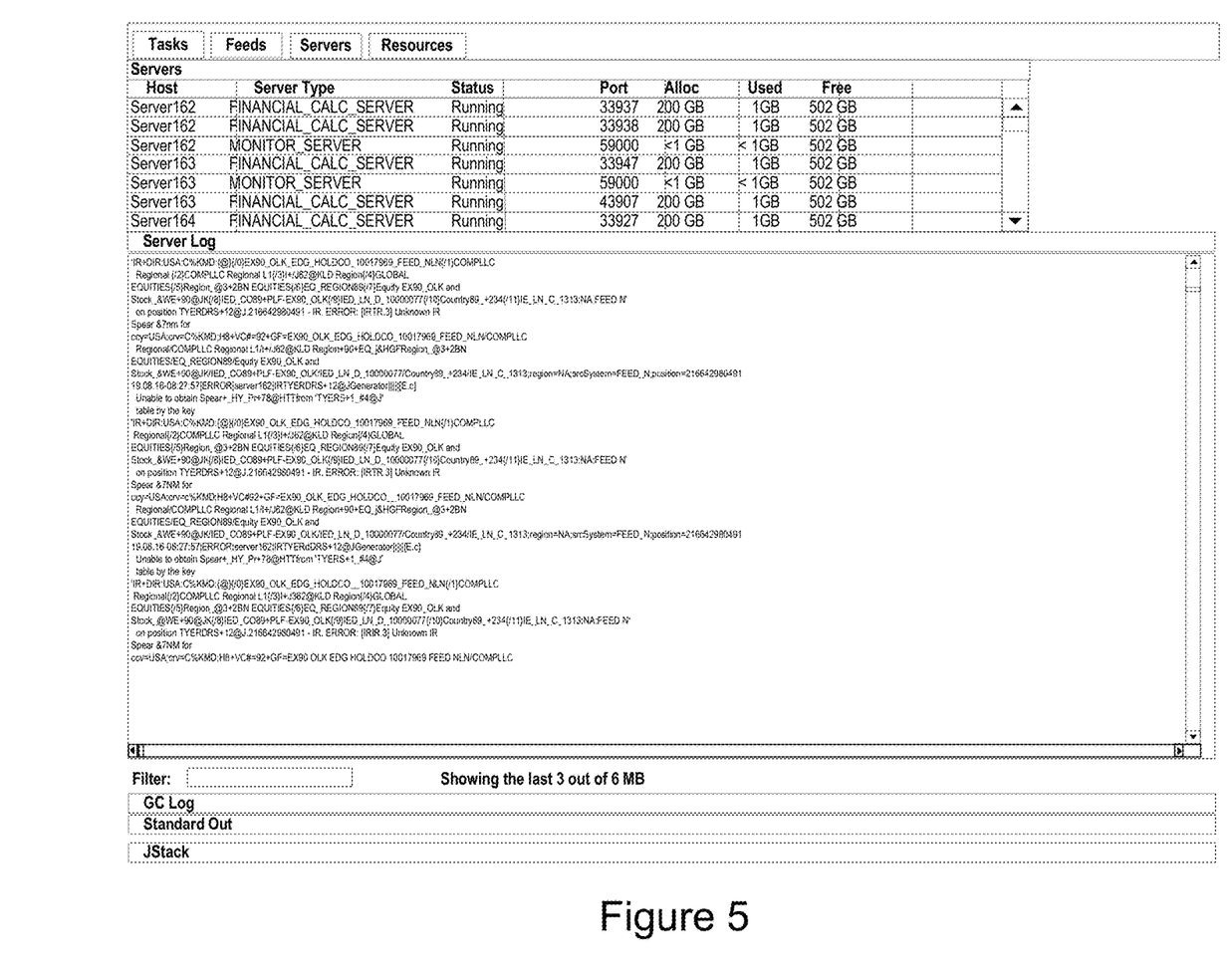
FIG. 5 depicts an exemplary servers tab in a user interface according to one embodiment.
Figure 6:
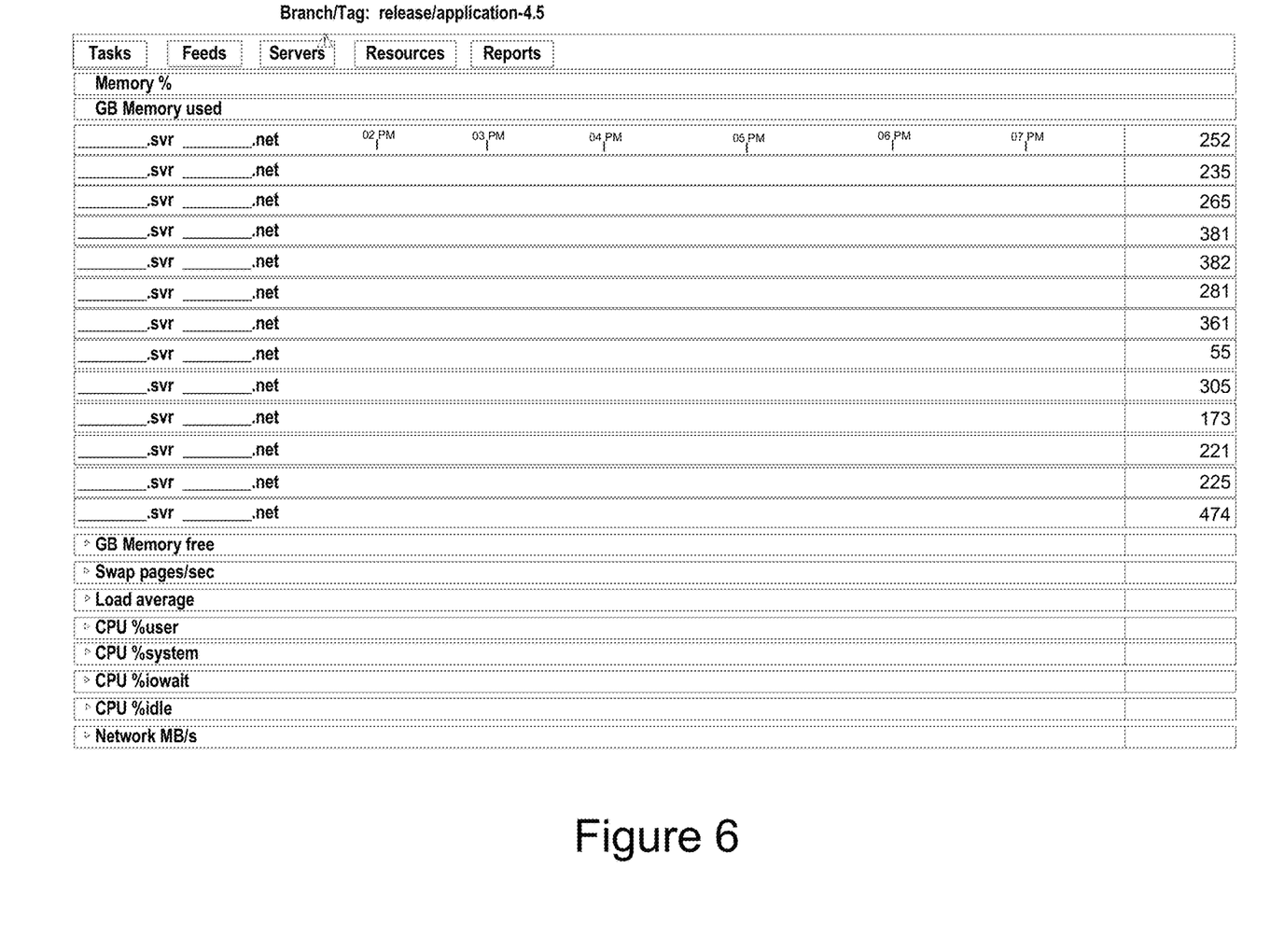
FIG. 6 depicts an exemplary resources tab in a user interface according to one embodiment.

In one embodiment, the user interface may include a servers tab that may show the currently active applications in the test environment and their memory use. In FIG. 5, which is an illustrative example of a servers tab, this information may be provided in the upper two portions of the screen. The selection of a specific application server may bring relevant data views in, for example, an accordion in the lower part of the screen.

The serer tab may also show a complete or partial server log file. The log content may be filtered to display only rows matching a phrase or searched using browser search function. If scrolled to the bottom, the server output may be tailed.

The server tab may also include a Java garbage collection ("GC") Log. In one embodiment, this may show GC activity since the last restart. The log view may be searched using browser search function. If scrolled to the bottom, the server output may be tailed.

The server tab may also include Standard Out ("stdout") logs. This may show data written on stdout since the last restart. The log view may be searched using browser search function. If scrolled to the bottom, the server output may be tailed.

The server tab may also include server process stacks. In one embodiment, the view may be searched using browser search function.

In one embodiment, the user interface may include a resources tab that may show resource usage such as memory usage and CPU load on the hosts on which the application servers are running. An example resources tab is provided as FIG. 6.

In one embodiment, the user interface may include a reports tab that may provide data on reports that may be produced during CI runs. An example reports tab is provided as FIG. 7. These reports may be generated daily, semi-daily, hourly, or as necessary and/or desired.

Figure 7:
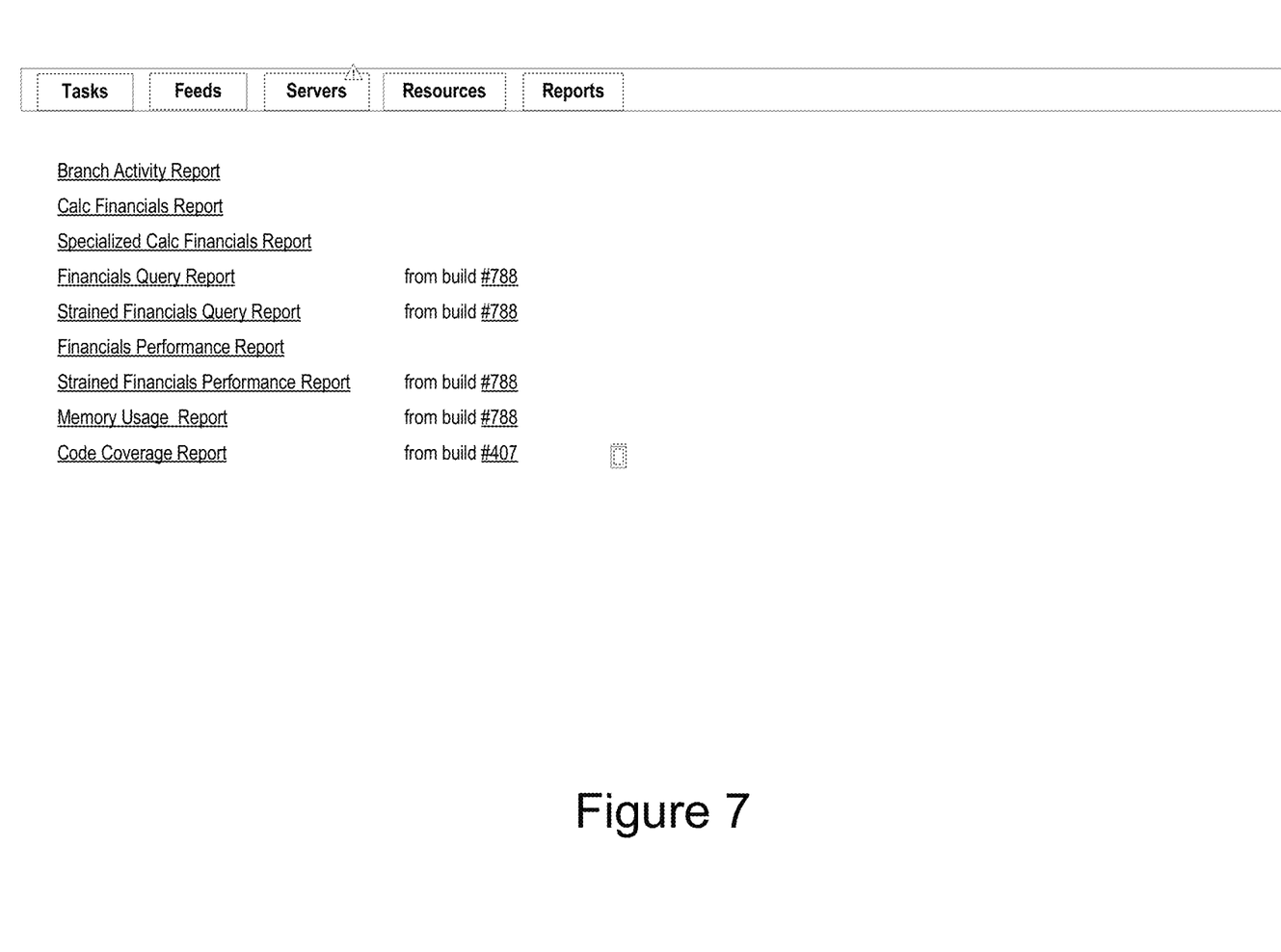
FIG. 7 depicts an exemplary reports tab in a user interface according to one embodiment.

In one embodiment, the reports may include a SCM Branch Activity Report that may show the code changes that were included in the run. The Branch Activity Report may show all branches that were at some point directly merged into the main branch (usually the trunk or a release branch). The report may show total commits/merges from main branch commits/merges to main branch commits bucketed by today, yesterday, 2 days ago, this week, last week, 2 weeks ago and more than 2 weeks ago time buckets. Other "time buckets" may be used as necessary and/or desired. Each count may display the associated commits. In one embodiment, the report may be integrated with the SCM's interfaces and may permit investigation into specific commit diffs and branches.

In one embodiment, a regression report may be generated that shows program output differences between the test run and the baseline run which may indicate programming errors in the test run. The regression report may be based on raw test results that may be pulled directly from current and baseline results. The report may be published as a spreadsheet and may be downloaded from a supplied link.

Performance Reports may be provided. These reports may provide performance figures for the test run compared to the baseline, showing differences in runtime that may have been caused by the code changes that were included in the test run.

A Code Coverage Report that shows which portions of the overall code that were run during the test and which portions were not run and therefore not tested may be provided. This report may show code coverage data, and may allow additional investigation from top-level, package, and/or class-level including the actual source code display.

An example reports tab is provided as FIG. 7.

Figure 8:
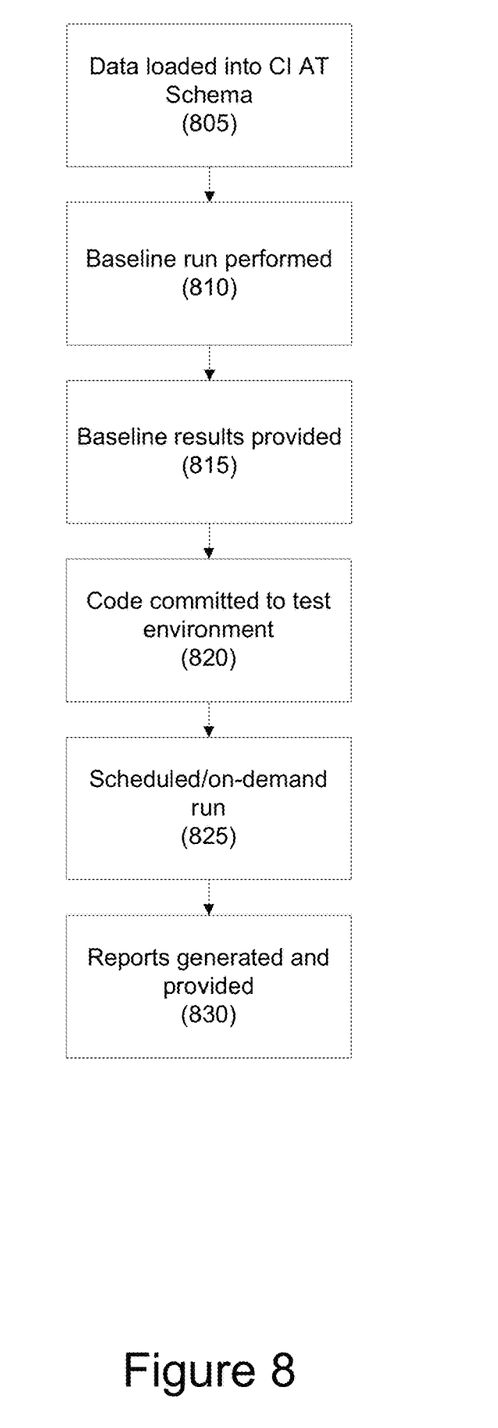
FIG. 8 depicts a method for continuous integration automated testing in a distributed computing environment according to one embodiment.

Referring to FIG. 8, a process for running CI AT is provided according to one embodiment.

In step 805, data may be exported from the application's production database and loaded into the CI AT database schema in preparation for a baseline run.

In one embodiment, this step may be skipped if, for example, the database has not changed, if the application data requirements have not changed since the last run, etc.

In one embodiment, the database export may include a full copy of the production database, or it may include a subset of the production database. In order to reduce runtime or compute resource requirements, the test may use a smaller set of data than the production run, and a full copy of the production database may not be required.

In step 810, a baseline run may be performed in order to establish a baseline test result. In one embodiment, the baseline run may use a version of the code that is known to produce correct results. The baseline run may be initiated automatically, for example when a new version of the application goes into production, or manually (e.g., on demand). In general, a new baseline run is required when the application changes in a way that causes the aspects of the program that are being monitored during the test to change. Such changes may include changes in program output, usage of compute resources, or performance.

In step 815, the baseline results (e.g., numeric, performance timings, resource use, etc.) may be recorded.

In step 820, code may be committed and may be pushed to the CI AT test environment. In one embodiment, new code may be pushed to the CI AT test environment periodically (e.g., hourly, daily, weekly, etc.) or as necessary and/or desired. In one embodiment, the CI AT system may test code that is in the mainline "trunk" or "master" branch of the version control system. In another embodiment, a dedicated branch may be used for the CI AT system, and code may be "pushed" into this branch in order to include it in test runs. In still another embodiment, developers may be provided with a mechanism to perform test runs against locally modified code before the code has been committed or pushed.

In one embodiment, the CI AT test environment may produce commit frequency/trend and commit list reports. These reports may identify developers that allow code to become stale in their local SCM repositories/branch without pushing the code to the trunk or release branches.

In one embodiment, code in contribution branches that fail testing may not be pulled out of the release. Instead, the developer must be able to disable the code without removing it.

In step 825, a scheduled (e.g., daily) or on-demand run, may be performed to test the newly committed code. If, for example, the test runtime is sufficiently short, a run may be performed each time code is committed to the branch that is used by the CI AT system. Runs may also be initiated by a timer (e.g., nightly), or they may be initiated manually after, for example, significant code changes. In one embodiment, a shorter run may be initiated upon each code commit, and a longer run that has greater code coverage may be initiated by a timer (e.g., nightly) or manually.

In one embodiment, scheduled runs may be canceled if no commits have occurred since the last run. Runs may also be canceled if compute resources are unavailable (e.g., they are occupied for other uses). A compute scheduler may be used that allows compute resources to be shared automatically.

In step 830, a set of reports that compare the results to the baseline run may be generated. In addition, a code coverage report may also be generated. Developers may be notified with the results, and potential issues may be identified. In one embodiment, the code commit or commits that caused a regression may be identified by an automated process that may iteratively remove commits. It may then rerun the test until the results match the baseline. Various algorithms, such as binary search, may be used to minimize the number of test runs that are required to identify the commit.

In another embodiment, a feature switch may be provided with code changes that may allow the change to be disabled, and the automated process may identify the change that caused the regression by iteratively disabling these switches.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for continuous integration automated testing in a distributed computing environment, comprising:
    in an information processing device comprising at least one computer processor:
        receiving computer-executable code for a computer application into an automated testing environment;
        using a plurality of testbed servers, executing a baseline system test run on the computer-executable code for the computer application by testing the computer-executable code with a set of input test data that is optimized for test execution time and test coverage and storing baseline test run results;
        receiving new computer-executable code for the computer application at a test environment;
        determining that the new computer-executable code for the computer application differs from the computer-executable code for the computer application;
        using the plurality of testbed servers, executing an system test run on the new computer-executable code for the computer application by testing the new computer-executable code with the set of input test data in the distributed computing environment and storing test run results;
        comparing the test run results to the baseline test run results;
        generating at least one report based on the comparing;
        identifying a regression in the test run results;
        automatically identifying a commit that caused the regression;
        disabling the commit that caused the regression; and iteratively disabling commits and repeating the test run until a change that caused the regression is identified.

2. The method of claim 1, wherein the computer-executable code for the computer application is loaded from a production database for the computer application.

3. The method of claim 2, wherein the computer-executable code for the computer application comprises a full copy of the production database for the computer application.

4. The method of claim 2, wherein the computer-executable code for the computer application comprises a portion of the production database for the computer application.

5. The method of claim 2, wherein the baseline run is executed automatically in response to a change in the production database for the computer application.

6. The method of claim 1, wherein the baseline run is executed automatically in response to a change in the computer application.

7. The method of claim 6, wherein the change comprises at least a change in an output of the computer application, a change in compute resources for the computer application, and a change in performance of the computer application.

8. The method of claim 1, wherein the test environment receives the new computer-executable code for the computer application from a master branch of a version control system.

9. The method of claim 1, wherein the test environment receives the new computer-executable code for the computer application from an alternate branch of a version control system.

10. The method of claim 1, wherein the test run is an on-demand test run.

11. The method of claim 1, wherein the test run is a scheduled test run.

12. A continuous integration automated testing system, comprising:
 a production database for a computer application;
 a plurality of testbed servers; and
 a server comprising at least one computer processor and a memory, wherein the at least one computer processor is configured to perform the following:
  receive computer-executable code for the computer application from the production database;
  using the plurality of testbed servers, execute a baseline system test run on the computer-executable code for the computer application by testing the computer-executable code with a set of input test data that is optimized for test execution time and test coverage;
  store the baseline system test run results;
  receive new computer-executable code for the computer application;
  determine that the new computer-executable code for the computer application differs from the computer-executable code for the computer application;
  using the plurality of testbed servers, execute an system test run on the new computer-executable code for the computer application by testing the new computer-executable code with the set of input test;
  store the test run results;
  compare the test run results to the baseline test run results;
  generate at least one report based on the comparison;
  identify a regression in the test run results;
  automatically identify a commit that caused the regression;
  disable the commit that caused the regression; and
  iteratively disable commits and repeat the test run until a change that caused the regression is identified.

13. The system of claim 12, wherein the computer-executable code for the computer application is loaded from a production database for the computer application.

14. The system of claim 13, wherein the computer-executable code for the computer application comprises a full copy of the production database for the computer application.

15. The system of claim 13, wherein the computer-executable code for the computer application comprises a portion of the production database for the computer application.

16. The system of claim 13, wherein the baseline run is executed automatically in response to a change in the production database for the computer application.

17. The system of claim 12, wherein the baseline run is executed automatically in response to a change in the computer application.

18. The system of claim 17, wherein the change comprises at least a change in an output of the computer application, a change in compute resources for the computer application, and a change in performance of the computer application.

19. The system of claim 12, wherein the new computer-executable code for the computer application is received from a master branch of a version control system.

20. The system of claim 12, wherein the new computer-executable code for the computer application is received from an alternate branch of a version control system.

* * * * *